Dec. 13, 1955     C. W. HOWARD     2,726,775

PRESS UNLOADERS

Filed Sept. 21, 1953     4 Sheets-Sheet 1

INVENTOR.
CHARLES W. HOWARD
BY
Reynolds, Beach & Christensen
ATTORNEYS

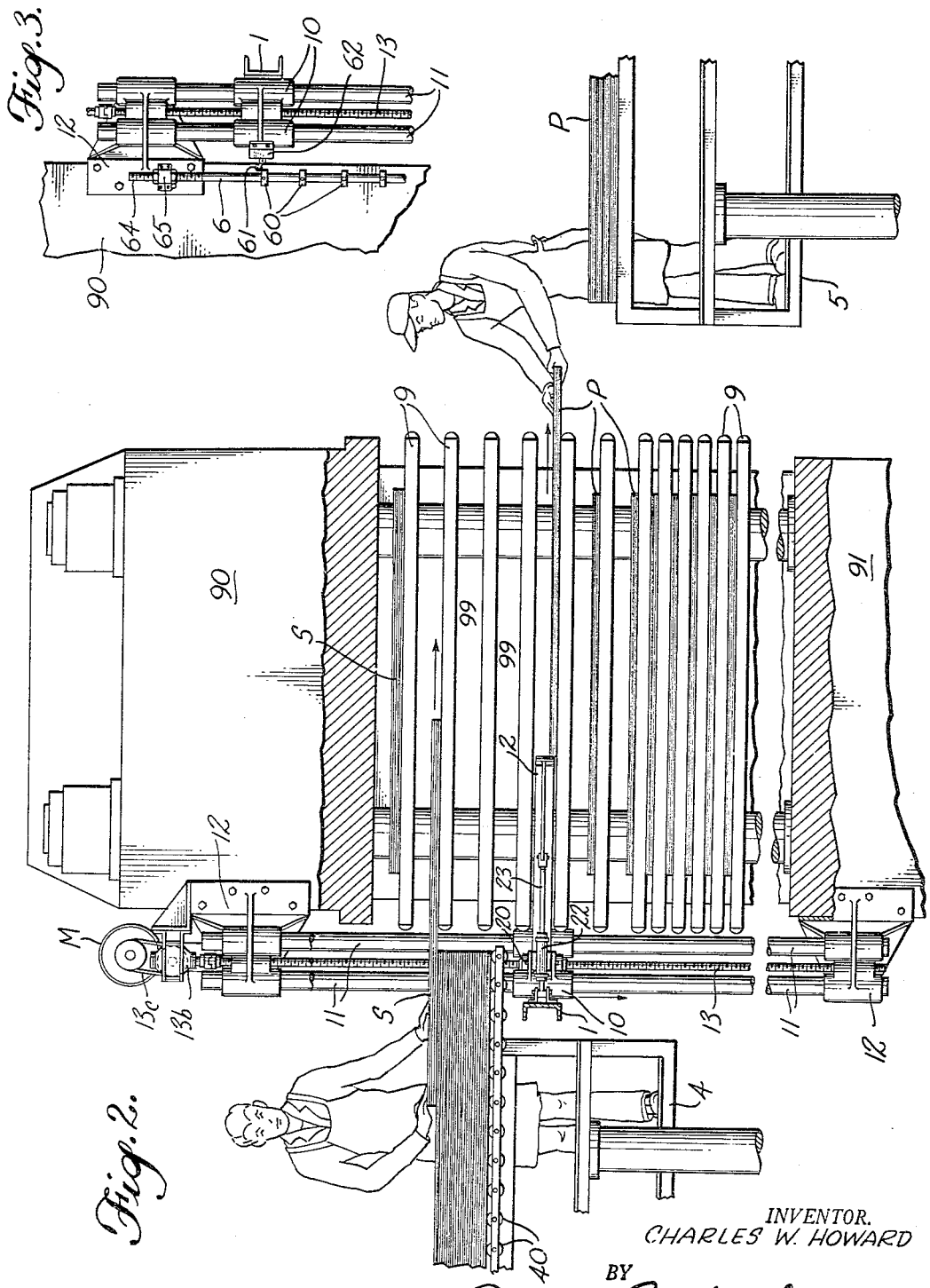

United States Patent Office 2,726,775
Patented Dec. 13, 1955

2,726,775

PRESS UNLOADERS

Charles W. Howard, Seattle, Wash., assignor to Manufacturers Machine Tool Co., Seattle, Wash., a corporation of Washington Application September 21, 1953, Serial No. 381,420

8 Claims. (Cl. 214—16.4)

The present invention is concerned with the unloading of a plywood press of a kind now widely used. Such press comprises a stack of platens, which opens successively from the top downwardly, and this invention has more especially to do with ejection of each panel which has been pressed therein from a laid-up sandwich, as those terms are used in the art, so that the ejecting operation may proceed from the top of the press downwardly almost immediately following the opening of any given press space, and before the press in its lower part has been opened, whereby while the unloading is in progress, and in advance of full opening of the press, loading of the upper openings may begin and may proceed downwardly, until very soon after the last plywood panel has been ejected from the lowermost press opening, that opening receives a new sandwich, and the press is ready to reclose. By such procedure, even with hand loading, which is preferable to machine loading for a number of reasons, the idle time of the press is reduced to a minimum, the liability of damage to the sandwich from the loading operation is reduced to a minimum because greater care can be taken with hand loading than with machine loading, and the press cycle is reduced substantially to an irreducible minimum, thereby achieving the maximum in capacity with no additional labor—indeed, with a saving in labor.

It should be understood that the present invention is not concerned with panel receiving or stacking mechanisms, and that any such as may be desirable may be used, or, as would ordinarily be the case, the ejected panels will be stacked in turn upon an unloading elevator, which is an extremely simple operation, and a press thus equipped would require, with its loading and unloading mechanism, the very minimum of floor space.

To put it somewhat differently, according to the present invention, as the opening of the press proceeds from the top downwardly, unloading begins, by the mechanism which is the heart of the present invention, very shortly after the first panel openings occur, and very shortly thereafter reloading commences, also from the top downwardly, and so there are occurring, at different levels in the press, the opening of the platens, the ejection of panels therefrom, and the loading of fresh sandwiches. Each such operation proceeds downwardly until the lowermost press opening is loaded, whereupon the press may close, and while the pressing proceeds all parts may resume their initial positions ready for reactuation after the pressing period is ended. The operation is initiated manually, but thereafter proceeds automatically, with the usual safeguards in case of difficulties arising. Completion of discharge of the individual panels is preferably effected manually, but may be effected by automatic means, as the particular discharge completing means forms no part of this particular invention. The present invention concerns primarily the unloading mechanism and method, quite apart from the press, but for use in conjunction with the particular type of press indicated, but in another phase the present invention includes, also, the loading elevator on which the load sandwiches to be pressed is stacked, the control means in general by which this elevator is lowered downwardly past the several press openings, and the coordination of that elevator and its controls with the controls for the unloading mechanism which is the heart of the present invention.

In the accompanying drawings the invention is shown in a presently preferred form, as will be more fully explained hereinafter.

Figure 2 is in effect a side elevational view taking in both the loading side and the discharging side, with parts of the press broken away for clearer illustration, all parts being shown in an intermediate position corresponding generally to Figure 1.

Figure 3 is a detail elevation from the side opposite Figure 2, illustrating certain parts of the control and the lowering mechanism, the viewpoint being illustrated at 3—3 in Figure 4.

Figure 1:
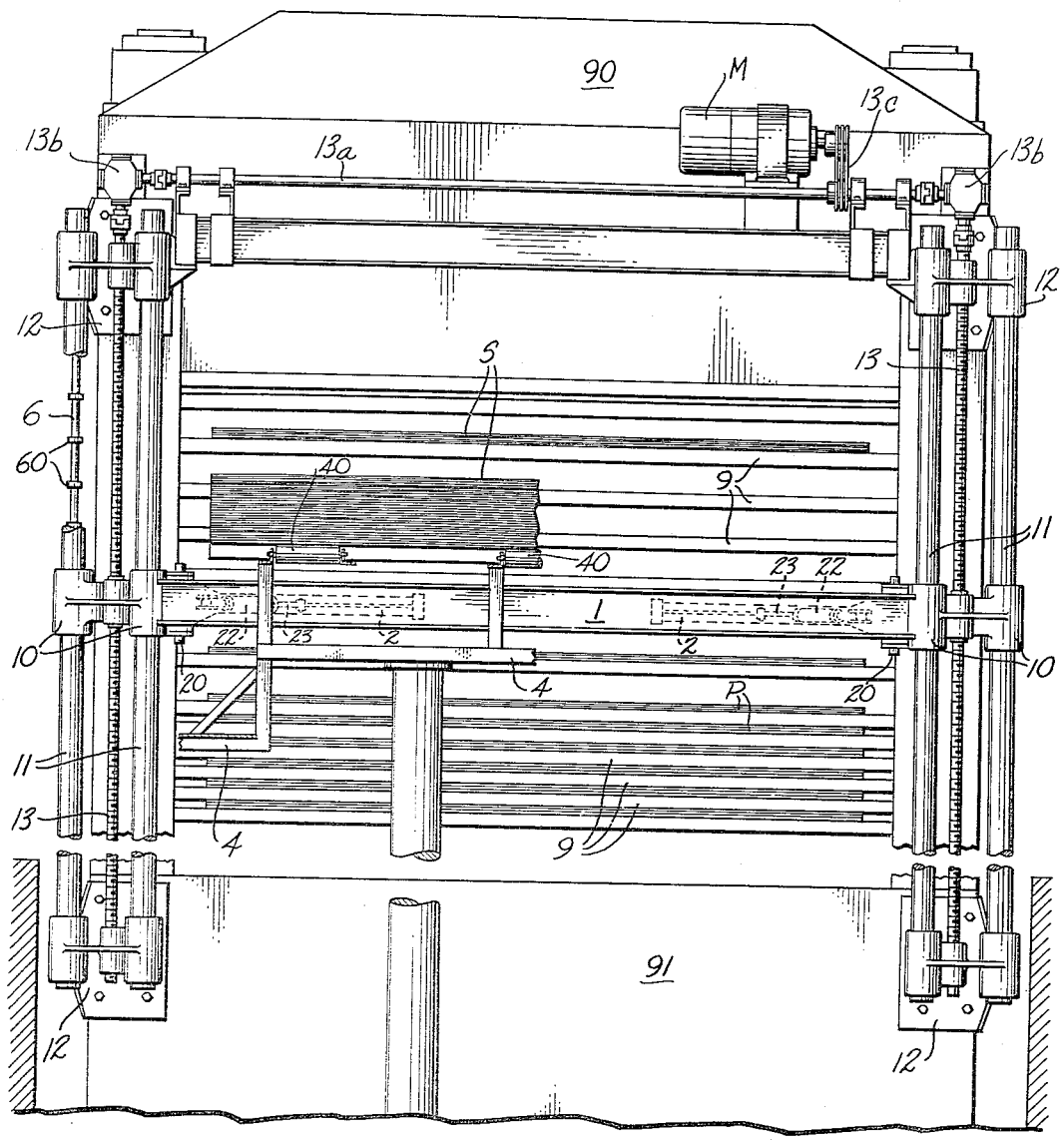
Figure 1 is a front elevational view of the press from the feed side, showing the press partly opened, partly loaded with already pressed panels, partly loaded with fresh sandwiches, and with the unloading mechanism in a position intermediate the top and bottom of the press. Parts are broken away in places for clearer illustration.

The press with which the present invention is intended to be employed comprises a stack of platens 9 suitably guided for vertical movement to draw them all upwardly against an upper head 90, the whole being supported from a base 91. Since the press is of a well known and commonly used type, and does not of itself constitute part of the present invention, many of its details are omitted. Among such omitted details are the stops by which the successive platens are stopped, as opening of the press proceeds, at such levels as to leave spaces 99 between each pair of adjoining platens for the reception of sandwiches S, one of which is shown being hand fed into a space 99 in Figure 2, from which spaces, after pressing, are ejected the resultant pressed panels P, one of which is being shown in Figure 2 in the process of ejection. As is best shown in Figure 2, the upper openings 99 are fully open, some have sandwiches received within them, some are vacant, and some have already-pressed panels in them awaiting ejection. The lower spaces 99 have not yet been fully opened and the panels therein are still under some compression, if no more than the weight of the platens thereabove.

The present invention is for use in conjunction with such a press, and comprises in brief a bridge member 1 guided for movement vertically up and down the press at the side opposite that from which the panels emerge. Mechanism is provided to support the bridge member at all times, and to stop it in registry with each successive press opening 99. Upon stopping thus flipper arms 2, which are carried by the bridge member 1, are actuated automatically to move into the press opening and to urge the panel therein outwardly away from the bridge. Immediately thereafter these flipper arms are automatically retracted or withdrawn clear of the press, and the bridge-lowering mechanism is reactuated to move the bridge member downwardly automatically to the next press opening, where the operation is repeated, and so on down until the lowermost press opening is cleared. In initiating the action, opening of the press is initiated, and then, either automatically or manually, lowering of the bridge 1 is begun, whereupon the automatic controls come into operation to bring it into registry successively with the press openings as they come open, or to lag possibly one or two openings behind, and after the unloading mechanism has cleared a few of the uppermost press openings, a loading elevator 4 is brought into operation, also automatically or manually, and is caused to lower so that the individual sandwiches S stacked thereon may be pushed into the uppermost and into each successive lower press opening. The loading operation can be done mechanically or by hand, and if done by hand, as is preferable, will proceed substantially as rapidly as the press can receive the sandwiches, so that there is no appreciable loss of time. In the meantime, the (partially) ejected panels are grasped by an operator upon a receiving elevator 5, are pulled clear of the press, and are there stacked or received for later disposition, for it will be remembered that the manner of receiving the ejected panels, whether upon the conventional pie rack, or in a stack upon the elevator 5, or otherwise, is not a necessary part of the present invention, although a hand stacking operation as the panels emerge from the press is preferred because it occupies the minimum of floor space.

Thus the operation proceeds, the unloading or ejecting mechanism coming into operation shortly after the first press openings have opened, and the reloading operation following very shortly after initiation of the ejecting operation, so that by the time the last press opening is open and the last such panel has been ejected, the loading operation is nearly completed, so that with only a small lapse of time the press may be reclosed promptly following the opening, unloading and reloading of the last or lowermost press opening.

The bridge 1 is carried by vertical guides which position it horizontally across the feed side of the press and which guide it for vertical movement relative to the press. Thus connected guide sleeves 10 at the opposite ends of the bridge slide along vertical posts 11 fixed at each side of the press, these posts being supported by brackets 12 which are fixedly secured to the fixed head 90 and to the base 91 of the press. The bridge is supported and is lowered and raised by suitable means such as the jack screws 13, which are journaled in the brackets 12 in parallelism to the guide posts 11 at each side, and which are connected through a countershaft 13a and bevel gears within the gear casings 13b to a reversible motor M through chain or belt mechanism indicated at 13c. Thus by rotation of the motor in one sense or the other, the bridge 1 may be raised, or lowered, and is positively supported at any given position.

Control of the elevation of the bridge 1 is accomplished by the provision of switches in a circuit to the motor M which serve to stop and to restart the motor, as will be explained in detail in connection with the wiring diagram, Figure 6. Control mechanism for the stopping mechanism is provided, for example, by the stop collars 60 spaced at intervals along a vertical rod 6 which is carried by the brackets 12. These stop collars 60 are so located, vertically of the rod 6, that whenever the arm 61 of a switch 62, which is carried on the bridge or its guide sleeves 10 at one end, engages a stop collar, it will interrupt this circuit to the motor M and stop the bridge in substantial registry with the corresponding press opening. In using the term "registry" it is not meant that the bridge must be physically opposite the press opening, but rather that it must be so located with respect to the press opening that flipper arms 2 carried by the bridge can enter and eject from the press opening with which the bridge is in registry the panel which rests upon the lower platen in such opening. The several collars 60 are individually adjustable along the rod 6, and in order to enable adjustment of the assembly as a whole, the rod 6 may be threaded at 64 (see Figure 3) for adjustment in a nut-like bracket 65 upon the fixed bracket 12.

Two flipper arms are employed, each pivoted at 20 upon the sleeves 10, and they are connected by a cross-link 21 or the like, so that both arms will swing from their withdrawn or retracted position, wherein they lie substantially parallel to the bridge 1, into a position more or less at right angles to the bridge, and the reverse. Compare Figures 4 and 5. Such movement is accomplished by suitable means, such as the pressure-actuated cylinders 22 and their plungers 23, the one mounted upon the bridge 1 and the other connected to its respective flipper arm outwardly of the pivot 20.

Figure 4:
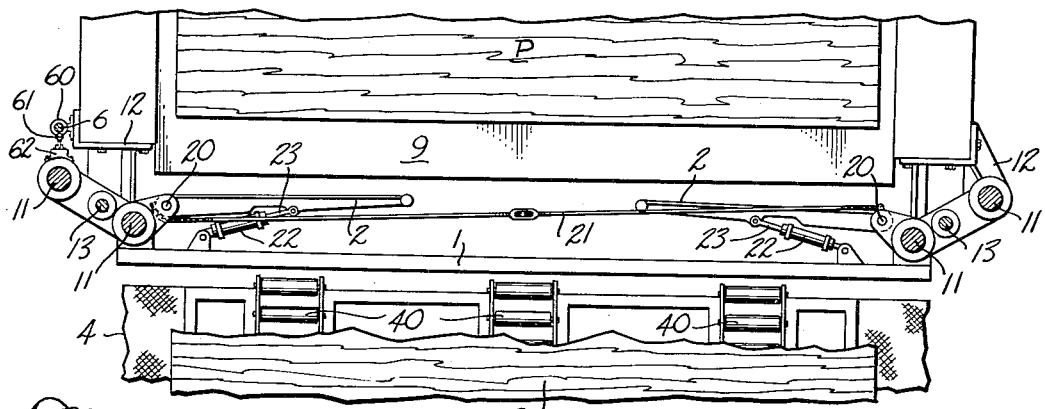
Figure 4 is a sectional elevation of the unloading mechanism at the plane of an opening between platens of the press, illustrating the unloading mechanism in an inactive or passive position.
Figure 5:
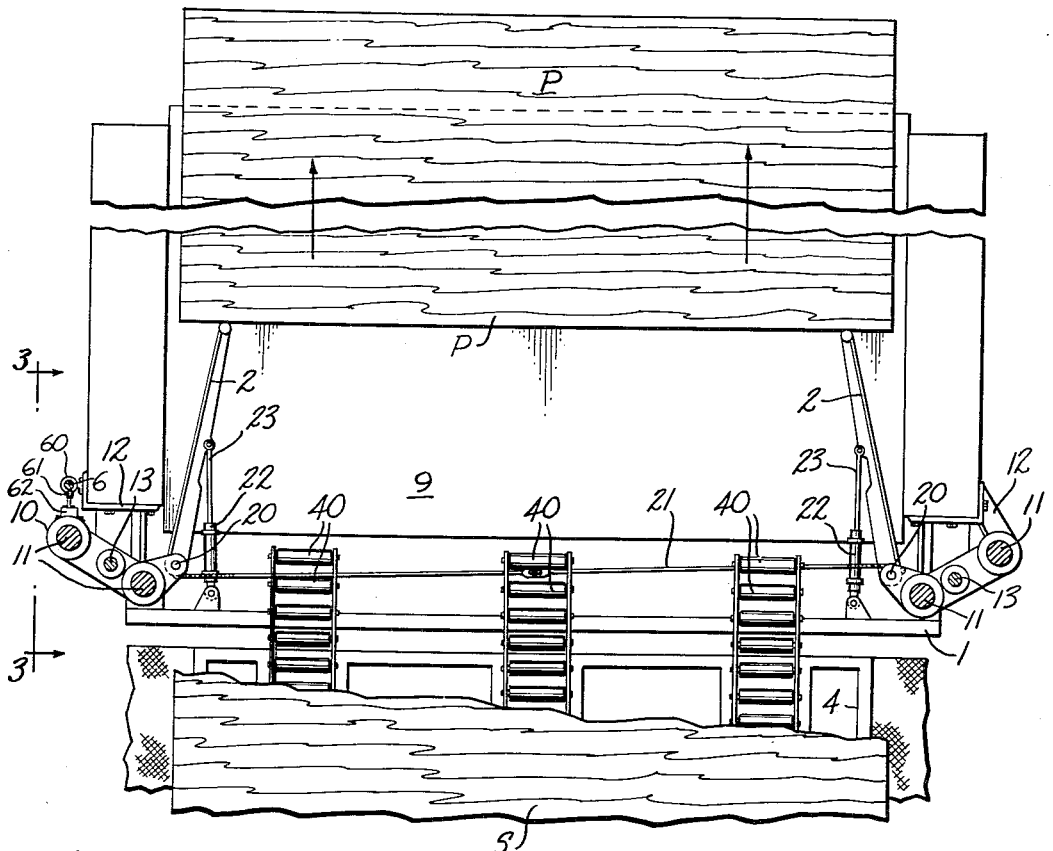
Figure 5 is a similar view showing the unloading mechanism in an active stage.

The withdrawn position of the flipper arms is shown in Figure 4, but upon the supplying of pressure to the pivoted end of cylinders 22, under control of mechanism which will be described in detail in connection with the wiring diagram, the plungers 23 are moved outwardly, and so swing the arms 2 simultaneously and equally by virtue of the cross connection at 21. This operation can only occur, through other control mechanism to be described later, at the time the bridge 1 is in registry with an open press opening, and when such is the case the flipper arms 2 sweep into the press opening just above the lower platen, and push outwardly or toward the opposite side of the press the completed panel P which is in this press opening. Immediately thereafter the direction of fluid supply to the cylinders 22 is automatically reversed, the plungers 23 are retracted, and this retracts the flipper arms 2 into their withdrawn position, being that shown in Figure 4.

In the meanwhile, as is best shown at the right in Figure 2 the (partially) ejected panel P is grasped by an operator and is piled upon the receiving elevator 5, or is disposed of in any other suitable fashion, for, as has already been indicated, the particular form assumed by the mechanism for receiving the ejected panels forms no part of this invention.

The loading elevator 4 is initially loaded with a stack of sandwiches S shown at the left in Figure 2, upon a roller conveyor 40. After the first few press openings have been opened and the panels have been ejected therefrom in the manner already described, the lowering of the elevator 4 commences, and it moves past each press opening in turn. It may or may not stop opposite each press opening, but as it comes into registry with each such press opening, an operator, riding the elevator, or two such operators, one at either side of the pile of sandwiches, moves the first sandwich into the first opening, and the second sandwich in the second opening, and so on. In the meantime the press has not yet opened in its lower portion nor been unloaded, but the loading elevator 4 can follow closely behind the bridge 1, which it overlies, and the loading proceeds very promptly after the unloading operation. The result is that when the last press opening opens, the flipper arms 2 very soon thereafter unload this opening, and very promptly after that the loading elevator 4 comes into registry with this last press opening, the opening is loaded with a fresh sandwich, and the press is then ready to be reclosed. Preferably the reclosing is accomplished manually by the operator who rides the loading elevator 4, so that in case of any difficulty arising, it will be assured that the press will not reclose before the difficulty can be adjusted and the press can be completely reloaded.

Figure 6:
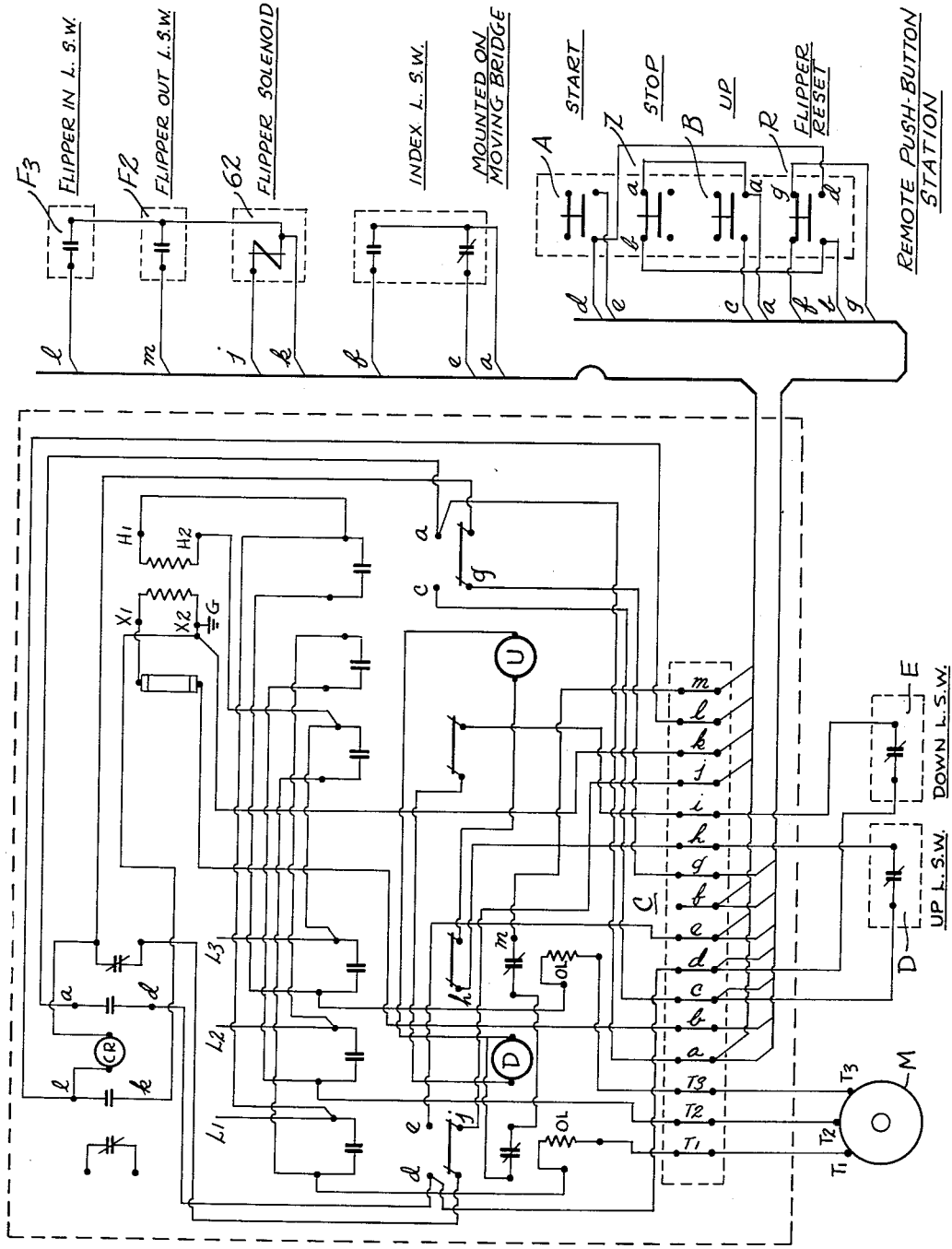
Figure 6 is a wiring diagram illustrating the various controls and their interrelationship.

The wiring diagram of Figure 6 is not, in its details, a part of this invention, but is simply a convenient means to the ends already indicated above. Any suitable or equivalent means may be employed in lieu of that shown.

A "start" switch A and a "stop" switch Z are located at a station convenient to the principal operator, and such station may be fixed on the frame near the upper limit of the elevator 4. A reversing or "up" switch B is also provided, for automatic or (usually) manual actuation. These switches primarily control the movement of the bridge 1. A flipper reset switch R enables a flipper arm to be reactuated in case its automatic controls, later described, fail to function. The "start" switch A is usually actuated manually, but if there is an automatic or mechanical means to receive the pressed and ejected panels, that switch may be arranged to be actuated by the opening of the first platen 9.

Pressure fluid is supplied to the double-acting flipper jacks 22 by way of a reversible solenoid valve (not shown) in a commonly understood manner, and a switch 62 on the bridge 1 effects energization of the solenoid, while switches F2 and F3 act as limit switches to terminate the outward and inward movements, respectively, of the flipper arms Z. The switch 62 is the one which is closed by engagement of its arm 61 with the successive collars 60, and that switch 62 is reset for reactuation, after successive energization of the limit switches F3 and F2, by further downward movement of the bridge and consequent disengagement of the arm 61 from the collar 60 which engaged it. The arm 61 thereupon is positioned for reengagement by the next lower collar 60. However, by electrical connections indicated generally at C, each reclosure of the flipper limit switch F3 automatically initiates further downward movement of the bridge 1, by reenergizing its motor M, which through the same general electrical connections C was deenergized by opening of the switch 62. Upper and lower bridge limit switches D and E, respectively, terminate the indicated movements of the bridge at the beginning and at the end of a cycle, the bridge at the cycle's end dropping below the lowest press opening.

The controls for the elevator 4 (and for the elevator 5, if the latter is used) may be separate from but synchronized with or may be interconnected with the bridge controls described in any convenient manner, within the skill of an electrical engineer.

I claim as my invention:

1. Unloading mechanism for use with a plywood press such as includes a stack of platens which receive and press individual sandwiches into panels in the spaces between successive platens, and which opens first the uppermost space and then in successive steps the next lower spaces, for discharge, said unloading mechanism comprising a bridge extending horizontally across the press at its side opposite that whence the panels are discharged, means guiding said bridge for vertical movement past all openings of the press, bridge-supporting and lowering means to lower it past all such openings, means operable to stop the bridge in any lowered position, successive means indexed with the several press openings, for operative engagement with the bridge-stopping means to stop the bridge in registry with the uppermost press opening and successively in registry with each lower opening in turn, panel pusher means carried by said bridge in position to enter and to engage and eject a panel within any such opening while the bridge is so stopped, and control mechanism for said bridge and said panel pusher means, and operatively connected thereto to move the panel pusher means automatically upon the bridge stopping opposite a press opening, into such opening for discharge of a panel from such opening, then automatically to withdraw the panel pusher means, and then automatically to initiate further downward movement of the bridge into registry with the next lower opening, there to be stopped by said indexed means and said bridge-stopping means, and so on successively until the lowermost opening has been unloaded, and the bridge is lowered therebeneath.

2. Unloading mechanism as in claim 1, wherein the panel pusher means comprise two flipper arms pivotally mounted upon the bridge, and normally withdrawn and lying in the direction of the bridge's length, and coordinated actuators for such flipper arms, actuated under control of said control mechanism to swing such arms simultaneously into the opening with which the lowering bridge is in registry at any given time, and then to withdraw such arms to their initial position preparatory to continued descent of the bridge to the next opening.

3. Unloading mechanism as in claim 2, wherein the actuators comprise interconnected fluid pressure cylinders and cooperating plungers, one connected to the bridge and the other to its respective flipper arm.

4. Unloading mechanism as in claim 1, wherein the bridge-elevating and lowering means comprises a motor-driven jack-screw alongside the bridge's vertical path and a nut threaded thereon and carried by the bridge.

5. Unloading mechanism as in claim 1, wherein the bridge-lowering means comprises a motor-driven bridge-elevating and lowering means operatively connected to the bridge, and the bridge-stopping means comprises a switch in a circuit of such motor, and wherein the indexed means comprises a post alongside the bridge's vertical path, and a series of collars spaced therealong at intervals corresponding to the spacings between press openings, and located in the path of said switch to engage and actuate the latter successively, to stop the bridge in registry with each press opening.

6. Unloading mechanism as in claim 1, including a plurality of panel pusher means carried by the bridge, and distributed across the same, and means supported from the bridge and operatively connecting said plurality of means for conjoint operation thereof, to engage each panel simultaneously at a plurality of points along the panel's following edge, and to advance all said pusher means equally.

7. Unloading mechanism as in claim 4, wherein the indexed stopping means includes a post parallel to the jack-screw, collars thereon at intervals corresponding to the open press spaces, and switch means on the bridge positioned to engage the successive collars and operatively connected to the jack-screw to stop its rotation.

8. Unloading mechanism as in claim 7, wherein the collars are individually adjustable along their post, and means for adjusting the post with its collars vertically relative to the press openings.

References Cited in the file of this patent

UNITED STATES PATENTS

| | | |
|---|---|---|
| 1,121,470 | Bushnell | Dec. 15, 1914 |
| 1,463,895 | Kehr | Aug. 7, 1923 |
| 1,486,633 | Carver | Mar. 11, 1924 |
| 2,264,125 | Wolf | Nov. 25, 1941 |
| 2,390,159 | Laucks | Dec. 4, 1945 |
| 2,500,791 | Baldwin | Mar. 14, 1950 |